May 26, 1925.

L. REITZ 1,539,409

APPARATUS FOR THE PRODUCTION OF HIGH PRESSURE ACETYLENE

Filed Nov. 14, 1924  3 Sheets-Sheet 1

May 26, 1925.
L. REITZ
1,539,409
APPARATUS FOR THE PRODUCTION OF HIGH PRESSURE ACETYLENE
Filed Nov. 14, 1924   3 Sheets-Sheet 3
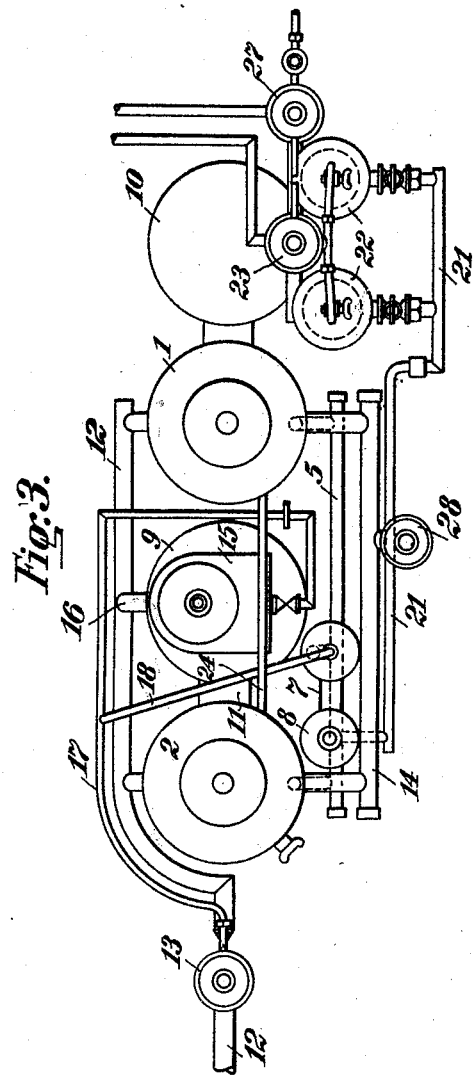

Patented May 26, 1925.

1,539,409

UNITED STATES PATENT OFFICE.

LUDWIG REITZ, OF DUSSELDORF-ELLER, GERMANY.

APPARATUS FOR THE PRODUCTION OF HIGH-PRESSURE ACETYLENE.

Application filed November 14, 1924. Serial No. 749,878.

*To all whom it may concern:*

Be it known that I, LUDWIG REITZ, citizen of Germany, residing at Alt Eller Nr. 27, Dusseldorf-Eller, Germany, have invented new and useful Improvements in an Apparatus for the Production of High-Pressure Acetylene, of which the following is a specification.

The invention relates to an apparatus for the production of high-pressure acetylene from carbide, the pressure being produced by the admission of water under pressure. Apparatus of this type have become known in which the water under pressure is forced into the closed generator by means of a hand-pump.

This working method is not advantageous owing to the considerable expenses for attendance and to the difficulty to accurately regulate the pressure.

According to the invention the attendance by hand and the expense of energy for the production of pressure are rendered unnecessary, and at the same time an accurate regulation of the pressure is obtained by connecting the generating chamber with a conduit for water under pressure, a pressure reducing valve being inserted. It is further of advantage to connect with the water space of the generator a closed pressure-equalizing vessel comprising an air- or gas bolster. In this manner the pressure of the water admitted, which is, a priori, adjusted in the reducing valve, is transmitted to the gas generator and maintained therein automatically up to the consumption of the carbide in the generator even when great fluctuations occur in the withdrawing of gas and when carbides are used which do not gasify uniformly. In order to produce continuously great quantities of gas in an economical manner the arrangement can be made, according to the invention, that several identical generators, the gas and water-spaces of which communicate permanently with one another, work simultaneously and co-operate like one single generator of corresponding size. To provide acetylene plants with several generators has been already proposed, but in plants of this type the several generators work alternately in order to make the working continuous, while, according to the invention, the several generators of one set are connected with one another so that they work simultaneously and at the same pressure, the water spaces as well as the gas spaces of the several generators communicating with one another so that equalization between the same must take place continuously.

Two forms of construction of a generating plant according to the invention are shown by way of example on the accompanying drawing in which:

Figs. 2 and 3 show a generating plant consisting of two generators communicating with one another and working both at the same time, said plant being designed for cutting- and soldering purposes, and of these Fig. 2 shows the plant in side elevation the one generator being shown partly in section.

Fig. 3 is a plan view of Fig. 2.

Figure 1:
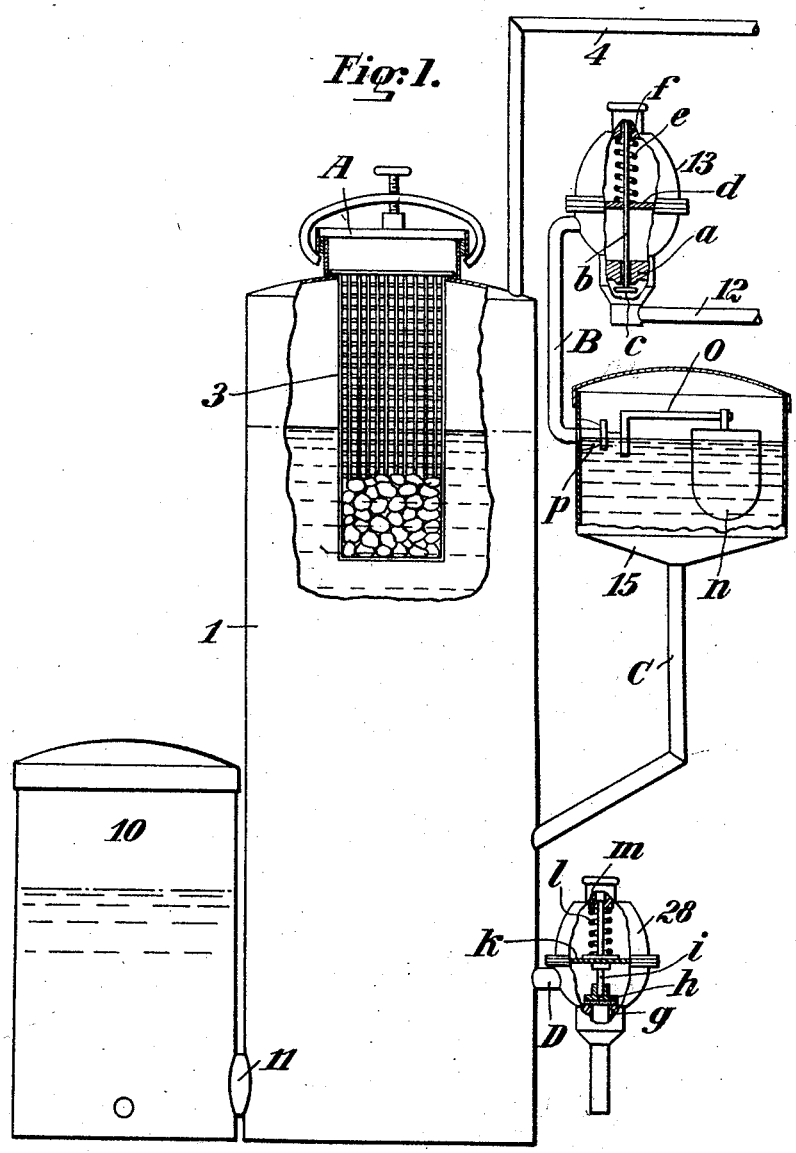
Fig. 1 shows diagrammatically in elevation a generator according to the invention.

In the form of construction, diagrammatically shown in Fig. 1, the generator consists of a vessel 1 closed by a lid A and containing a convenient number of carbide receptacles 3. These carbide receptacles 3 consist of wire cages suspended into the generator vessel at the upper end of the same. On the top plate of vessel 1 the gas discharge pipe 4 is mounted and with the lower end of vessel 1 a pressure compensation vessel 10 is connected by means of a wide tubular connection 11. Into this vessel 10, which is gas tightly closed, the water of the generator flows through the tubular connection 11 from below so that in the upper part of vessel 10 an air- or gas-bolster is formed. The generator vessel 1 is further connected by a pipe C with a receptacle 15, which is completely enclosed and in which a float $n$ is arranged, which, through the intermediary of a lever $o$, controls the inlet valve $p$ of a water pipe B for water under pressure. This receptacle 15 is mounted at such a height that the float $n$ closes the inlet valve $p$ at the highest water level in the generator vessel 1. The water under pressure flows from a pipe 12 through a pressure reducing valve 13 into pipe B and through the float vessel 15 and tube C into the generator vessel 1. The pressure reducing valve 13 comprises a diaphragm $d$ which is loaded by a spring $e$ the pressure of which is adapted to be regulated by means of a screw $f$, said spring acting upon the rod $b$ of a valve $c$ which controls the passage through a horizontal partition $a$ so that the pressure of the water supplied through pipe 12 is reduced to the pressure at which the spring $e$ is adjusted. With the lower part of the generator vessel 1 an outflow valve 28 is connected by a tubular connection D, said outlet valve operating automatically when a predetermined maximum pressure is exceeded so that water flows out of the generator vessel 1. This outlet valve 28 comprises a diaphragm $k$ which is loaded by a spring $l$ the pressure of which can be regulated by means of a screw $m$. This diaphragm $k$ controls the rod $i$ of the valve $h$. So long as the pressure of spring L is greater than the pressure in the generator vessel 1 valve $h$ is pressed on the seat formed by the upper end of the outflow pipe $g$.

The operation of this apparatus is as follows:—

When, a fresh charge having been filled into the carbide cages 3, the lid A of the generator vessel 1 has been closed and the cock not shown of the water pipe 12 has been opened, the water will flow into the generator vessel 1 at the pressure for which the pressure reducing valve 13 has been adjusted, for instance 1 atm. above the atmospheric pressure, until the water level arrives at the carbide in the cages 3. The water flows at the same time through the tubular connection 11 into the pressure-compensation vessel 10 in which it rises in compressing the gas bolster. The pressure of the gas generated by the decomposition of the carbide by the water prevents a further inflow of water into vessel 1 and into the pressure compensation vessel 10 as soon as the pressure of the gas in vessel 1 and the pressure of the gas in vessel 10 are equal to the pressure adjusted in the pressure reducing valve, viz 1 atm. above atmospheric pressure. The inflow of water ceases, and the apparatus continues to work automatically without further admission of water until the carbide has been completely consumed. If acetylene is withdrawn from the generator, whereby the pressure in vessel 1 is reduced, the air bolster in vessel 10 expands immediately and the water in vessel 1 rises until it comes again in contact with the carbide. By the gas freshly generated the pressure in the generator vessel 1 is increased to the predetermined degree. If however the discharge of gas is suddenly interrupted, the pressure in the generator will increase so that the water is forced from vessel 1 into vessel 10. In this manner the generation of gas is interrupted. The outflow valve 28 serves merely as safety valve in case a higher pressure than the predetermined pressure should be produced by "after-generation," e. g. when this pressure exceeds for instance 1.3 atm. The air compressed in the pressure compensation vessel 10 serves as spring for moving the water column for compensating irregularities in the gasifying of the carbide and in the discharge of gas.

The float receptacle 15 begins to operate after the carbide has been completely decomposed. In this case the water rises as high as the adjusting of the float permits. If this highest water level has been reached the inflow of water is automatically shut off so that no water can get into the gas discharge pipe 4.

For generators of small size this float receptacle is not required.

Figure 2:
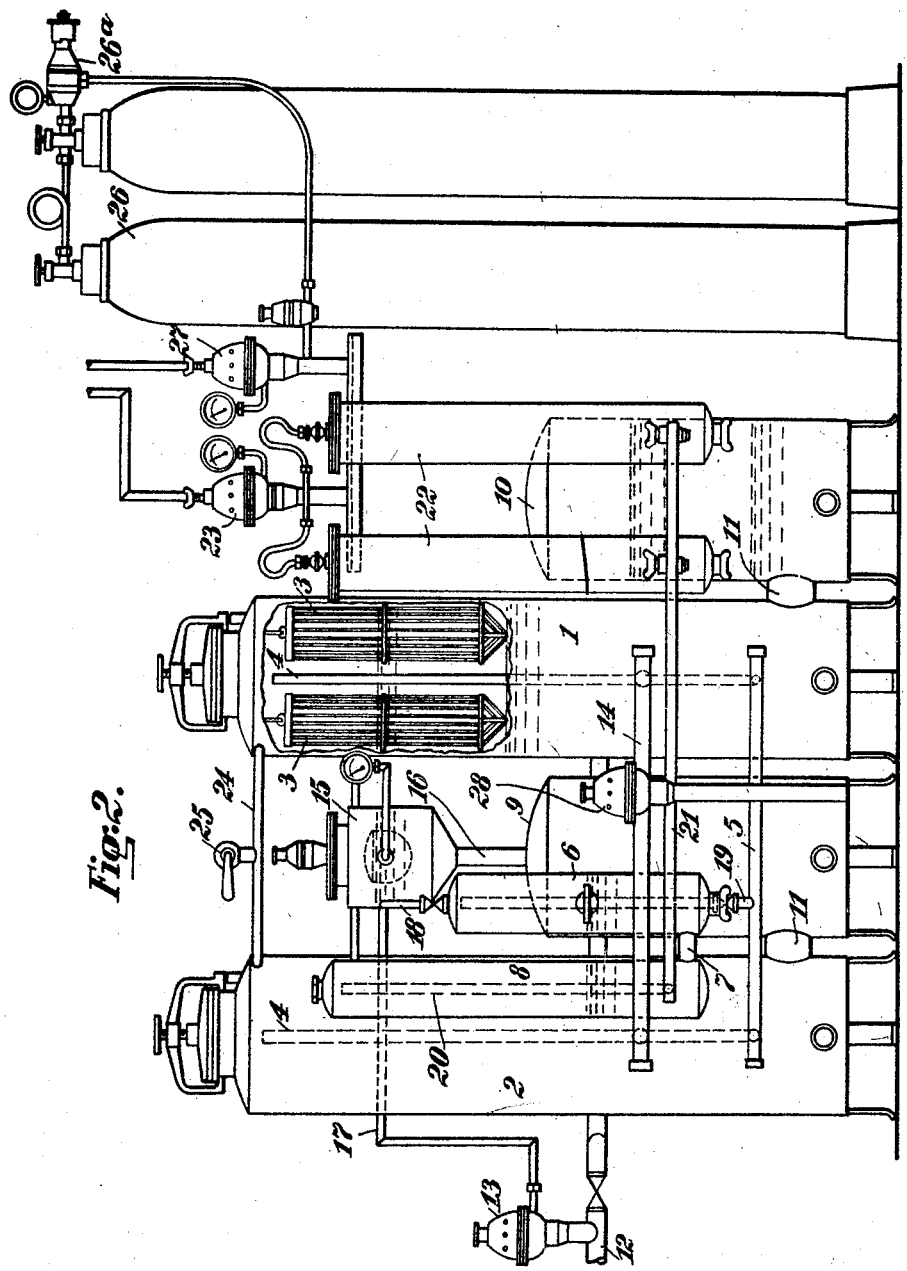

In order to be able to produce large quantities of gas with apparatus of this construction without increasing the size of the generator, a plant as shown in Figs. 2 and 3 is used. This plant, which is intended for cutting and soldering, comprises two generators constructed as described and connected with one another in such a manner that they work simultaneously.

The water spaces of the generators 1 and 2 are connected the one with the other by the pipes 14 and 12 (Fig. 3) and the gas spaces are permanently connected the one with the other by a pipe 24 at the upper ends of the generators serving for equalizing the pressure and by a pipe 5 which connects the two gas outlet pipes 4. The water level and the gas pressure will therefore always be equal in the two generators 1, 2 and the generating of acetylene from the carbide in the cages 3 of the two generators will consequently be always uniform.

Each generator 2 and 1 is connected with a pressure compensation vessel 9 or 10 respectively by tubular connections 11. The water under pressure is supplied by water pipe 12, the pressure of the water being regulated by a pressure reducing valve 13.

The gas generated in the two generators flows into the pipe 5 and through a tubular connection 19, having a cock, into the water seal and washer consisting of two water vessels 6 and 8 connected the one with the other by a tubular connection 7. The gas which flows into water vessel 6 forces all the water out and passes through the tubular connection 7 into the lower end of water vessel 8, rises through the water in this vessel, and flows out through tube 20 into a pipe 21, and through this pipe into one of the two purifiers 22 which are alternately put in service.

The float receptacle 15 serves for regulating the height of the water level in the generators 1 and 2 and it is connected with the same by tubes 16 and 12 (Fig. 3). When the pressure in the generators decreases owing to consumption of gas the automatically acting valve 13 enters into operation and the pressure is compensated by re-filling the generators with water. The pressure compensation vessels 9 and 10 are filled with water at the same time in accordance with the height of the water pressure in the generators. At sudden withdrawing of a greater quantity of gas the pressures between the generators and their pressure compensation vessels will be compensated at first. If the generators are working at full charge and if the gas discharge is suddenly interrupted the water is forced back from the carbide cages 3 and fills first the pressure compensation vessels 9 and 10. At a predetermined pressure the safety valve 28 opens to let escape the generator water in excess. When the carbide in the cages has been exhausted the water rises until the water level reaches the height of the float receptacle 15, connected with the generators by the tubes 12 and 10, whereupon the float is lifted and shuts off the admission of water through pipe 17.

The central water seal or washer 6, 7, 8 is filled with water from the water main 12 through a connecting pipe 18 having a cock.

The gas discharge takes place generally through the fine-regulating valve 23 in which terminate the conduits coming from the purifiers 22. When the plant serves for soldering or cutting, the oxygen is taken from one or two parallel-connected oxygen bottles 26, through the intermediary of a corresponding special pressure-reducing valve 26ª and a fine-regulating valve 27 by which the oxygen is brought to the desired pressure. The two valves 23 and 27 for acetylene and oxygen guarantee an absolutely uniform pressure-regulation.

The connecting pipes 12 and 14 for the water spaces of the generators 1 and 2 may be preferably used also for refilling water simultaneously into both generators. The connecting pipes for the gas spaces of the generators 1 and 2, especially pipe 24, may also be used for discharging air. With this object in view a cock 25 is inserted in pipe 24.

As will be understood from the above description the pressure must always be equal and the generating of gas must always be uniform in the two parallel-connected generators 1 and 2, the gas- and water spaces of which are permanently connected with one another so that the two generators act together like one single generator of greater dimensions. If the plant has to work continuously a second aggregate of generators, of similar construction as described and shown, must be provided which works alternately with the first aggregate. Any number of simultaneously working generators may be used.

By the arrangement described considerable advantages, in comparison with the use of one single generator for higher pressure and of correspondingly greater dimensions, are obtained viz:—

(1) The generators of the plant according to the invention do not require such thick plates of sheet metal as generators of the same capacity which are now in use, as the thickness of the sheet iron must not only increase in the same proportion as the volume of the generator but in a considerably greater proportion in order to ensure the required security of service.

(2) The cost of erection of the plant according to the invention is considerably lower as, even for plants of very great efficiency, it is possible to use generators made exclusively by tinsmiths, the other much larger generators, commonly used, requiring boiler-smith's work.

(3) In acetylene plants with larger sized generators the weight of the elements of the generator to be moved at every fresh charge becomes sometimes so great that the charging is unwieldly and difficult. For this reason the size of generators was limited, and in cases where a generator of normal size was not sufficient several complete generators with washers and purifiers were to be connected with one gas holder. The separate washers and other auxiliary apparatus increased however the cost of the plant, required more space and higher expenses for attendance, as every generator plant has to be attended separately. According to the invention it is possible to considerably reduce the weight of the elements to be moved at fresh charging and to increase the output of the plant to any desired degree without however making the area of the plant considerably greater nor increasing the cost of attendance very much in comparison with that for one generator of greater size.

The working of the plant regulates itself automatically at the simultaneous working of the several generators owing to the inner pressure-equalization between the generators of one aggregate so that no supervision is required.

The constructional details could evidently be altered without exceeding the limits of the invention. Instead of the generator with suspended carbide cages any other type of generator might be used in which the generation of the gas is regulated by rising or sinking of the water in the generator. The arrangement and construction of the several elements of the plant may also differ from those described and shown.

Having now particularly described and ascertained the nature of my said invention, I declare that what I claim is:—

1. In an apparatus for generating high-pressure acetylene gas, comprising a closed generator adapted to operate under a predetermined pressure and containing a water space and a carbide holder, a conduit for supplying water to the generator and an automatic pressure regulating device in said water conduit, said pressure regulating device cooperating with the generator and operating to supply water thereto when the pressure in the generator drops below the predetermined pressure.

2. In an apparatus for generating high-pressure acetylene gas, comprising a closed generator adapted to operate under a predetermined pressure and containing a water space and a carbide holder, a conduit for supplying water to the generator, an automatic pressure regulating device in said water conduit, said pressure regulating device cooperating with the generator and operating to supply water thereto when the pressure in the generator drops below the predetermined pressure, and a closed pressure compensating vessel adapted to enclose an air bolster and connected with the water space of the generator.

3. In an apparatus for generating high-pressure acetylene gas, comprising a closed generator adapted to operate under a predetermined pressure and containing a water space and a carbide holder, a conduit for supplying water to the generator, an automatic pressure regulating device in said water conduit, a closed receptacle in said water conduit between the generator and pressure regulating device, and float controlled means in said closed receptacle adapted to interrupt the inlet of water into the receptacle when the water therein rises above a predetermined level, said pressure regulating device and float controlled means cooperating with the generator and operating to supply water thereto when the pressure in the generator drops below a predetermined level.

4. In an apparatus for generating high-pressure acetylene gas, comprising a closed generator adapted to operate under a predetermined pressure and containing a water space and a carbide holder, a conduit for supplying water to the generator, an automatic pressure regulating device in said water conduit, a closed receptacle in said water conduit between the generator and pressure regulating device, float controlled means in said closed receptacle adapted to interrupt the inlet of water into the receptacle when the water therein rises above a predetermined level, said pressure regulating device and float controlled means cooperating with the generator and operating to supply water thereto when the pressure in the generator drops below a predetermined level, and a closed pressure compensating vessel adapted to enclose an air bolster and connected with the water space of the generator.

5. In an apparatus for generating high-pressure acetylene gas, comprising a closed generator adapted to operate under a predetermined pressure and containing a water space and a carbide holder, a conduit for supplying water to the generator, an automatic pressure regulating device in said water conduit, a closed receptacle in said water conduit between the generator and pressure regulating device, said pressure regulating device cooperating with the generator and operating to supply water thereto when the pressure in the generator drops below the predetermined pressure, an adjustable outlet valve connected with the water space of the generator and means for automatically opening said valve when the pressure in the generator exceeds a predetermined maximum pressure.

In testimony whereof I have hereunto set my hand in presence of two subscribing witnesses.

LUDWIG REITZ.

Witnesses:
HEINZ W. HAAS,
WILLIAM E. LANE.